United States Patent [19]

Pongracz

[11] 4,293,774

[45] Oct. 6, 1981

[54] METHOD AND DEVICES FOR REGULATION OF THE FORWARD TRAVEL OF A STRIP BEARING MARKS AT REGULAR INTERVALS, AND A WRAPPING-MACHINE EMPLOYING SUCH A DEVICE

[75] Inventor: Endre Pongracz, Vaud, Switzerland

[73] Assignee: SAPAL Societe Anonyme des Plieuses Automatiques, Switzerland

[21] Appl. No.: 85,207

[22] Filed: Oct. 16, 1979

[30] Foreign Application Priority Data

Nov. 20, 1978 [CH] Switzerland ........................ 11868/78

[51] Int. Cl.³ .............................................. G01N 21/86

[52] U.S. Cl. ....................................... 250/548; 226/45; 250/557

[58] Field of Search .................... 250/548, 557; 226/45

[56] References Cited

U.S. PATENT DOCUMENTS 3,861,983 1/1975 Harrell .

4,209,708 6/1980 Sestini ................................ 250/568

FOREIGN PATENT DOCUMENTS 2605602 8/1977 Fed. Rep. of Germany .

1418916 12/1975 United Kingdom .

*Primary Examiner*—David C. Nelms

*Assistant Examiner*—Darwin R. Hostetter

*Attorney, Agent, or Firm*—Stevens, Davis, Miller & Mosher

[57] ABSTRACT

In a wrapping machine a strip bearing repetitively markings and marks is cut up into sections for individual wrapping of articles such as slabs of chocolate.

It is desirable to have available a correction in both directions, which is accurate over a wide margin, to avoid restrictions on the printing of the strip, and to allow continuous forward travel and a high rhythm.

Circuits (100–120) validate a mark detection signal (LECTREP) while eliminating interference and irrelevant signals and evaluate the phase shifts between this signal (LECTREP) and a synchronization signal (SYNCHR) depending upon the machine. They establish a correction limited to a certain maximum. The correction acts upon a motor (1) which drives the strip. The maximum is such that the cut section remains usable, which avoids interruption, and leaves an article wrapped in this defective section for later elimination.

14 Claims, 7 Drawing Figures

Figure 2:
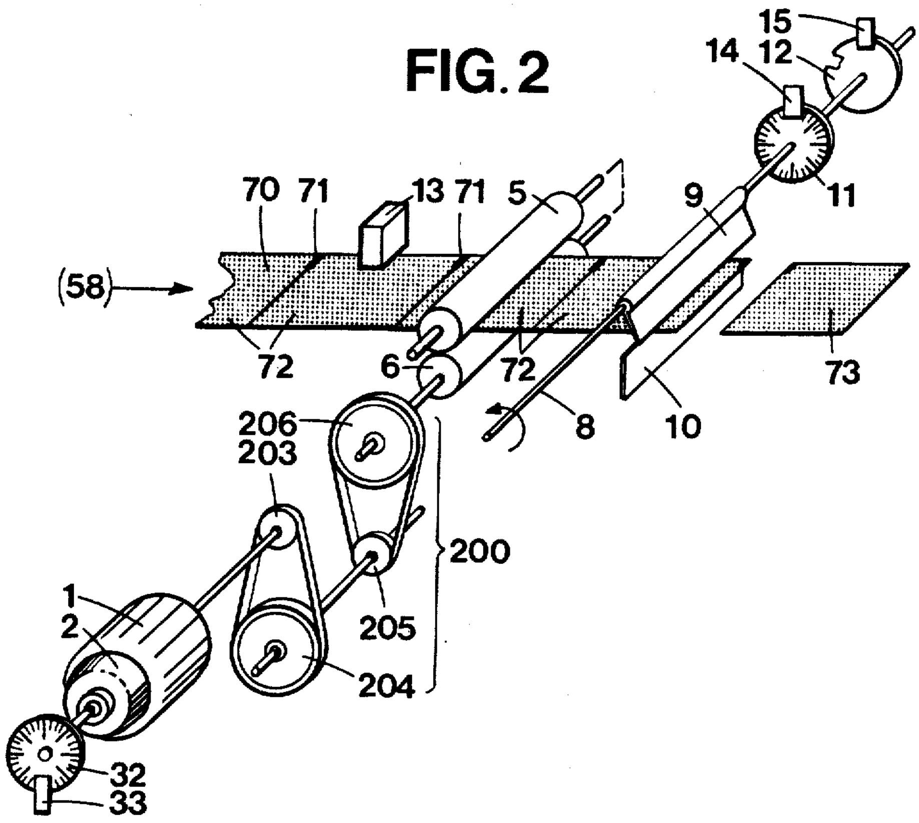

METHOD AND DEVICES FOR REGULATION OF THE FORWARD TRAVEL OF A STRIP BEARING MARKS AT REGULAR INTERVALS, AND A WRAPPING-MACHINE EMPLOYING SUCH A DEVICE

The invention refers to the general field of high-rate wrapping machines. Such machines are employed, for example, for carrying out at high rate the individual wrapping of slabs of chocolate or of other products appearing in a like manner. The wrapping of an article necessitates the execution of a relatively complicated sequence of operations of positioning, folding and gluing, which are carried out automatically.

A machine of this species receives on the one hand a succession of articles to be wrapped, such as slabs of chocolate, and on the other hand a succession of cut-off wrapper sections, each of which is employed by the machine for wrapping an article.

The succession of sections is as a rule supplied by a printing house in the form of a continuous strip including repetitive separation marks as well as texts or drawings of the appearance of the article. The strip is supplied rolled into the form of a spool.

In order to ensure a high rate and to avoid interruption there are arranged upstream of the sectioning station two spools, a feed spool and a spare spool. When the first is nearly consumed a device connects the spare spool to the strip without interruption of the operation of the machine.

Such a device is well known to those skilled in the art by the name of a "splicer". As soon as the splicer has started off the second spool, the first, which is used up, is replaced by a full spool and forms the spare spool. Hence the replacement of spools does not necessitate any interruption in machine operation.

The machine includes a sectioning station and in order that the sectioning shall be correct it includes a means for detecting the marks upstream of the sectioning station and a means for correcting the forward travel of the strip in order that the sectioning is in accordance with the marks with a given tolerance.

In a conventional machine a main driving shaft drives all of the wrapping members as well as the rollers which control the forward travel of the strip which is often a strip of paper, upstream of the section station. The forward travel of the paper will be referred to although the strip may be of another material such, for example, as cellophane or synthetic matter.

An arrangement of this species is described, for example, in Swiss Pat. No. 305.288 belonging to the Applicants. However, the machine described in the aforesaid patent exhibits various disadvantages: the correction is carried out in one direction only and the maximum value of the correction remains small, of the order of 2 to 3 mm. Again, the system of detection imposes restrictions as far as the printing of the paper is concerned and on the other hand the detector is put out of operation periodically during one portion of the operating cycle of the machine. Finally the arrangement described is applied to the case of an intermittant forward travel of the paper and operation at a high rate presents serious dynamic problems.

The disadvantage of a small margin of correction becomes apparent especially in the following cases:

Firstly, if the splicer presents an error exceeding the possible amplitude of correction the machine must be stopped and the positioning of the strip corrected.

Secondly, even independently of the employment of a splicer it may be that the strip supplied exhibits a local defect in the marks due, for example, to incorrect connection between two ends of strips. In such a case too one is obliged to stop the machine when the defect exceeds te said amplitude.

Thirdly, the machine must form the subject of an adjustment as a function of the length of the cut section. The tolerance of this adjustment must obviously be smaller than the margin of correction which is small, so that the adjustment is tricky.

An arrangement is known from the German patent application No. 2.203.383 which likewise exhibits certain disadvantages: the correction is carried out in one direction only and restrictions are imposed as far as the printing of the paper is concerned. The correction is carried out by a device including a differential and an electromagnetic brake combined with an electromagnetic clutch which are members subject to sensible wear and the accuracy attained is low.

From the Swiss Pat. No. 516.436 another arrangement is known, which is adapted to a continuous forward travel of the paper and in which the detection is not locked during the cycle. However, at the other points this arrangement exhibits practically the same defects as the one described in the Swiss Pat. No. 305.288 mentioned above.

The German Pat. No. 1.461.898, the German patent application No. 2.524.365 and the American Pat. Nos. 2,611,224 and 2,636,731 likewise describe arrangements of the same species which exhibit the majority of the defects indicated in relation to Swiss Pat. No. 305.288 mentioned above; in particular the correction is carried out in one direction only, restrictions are imposed as far as the printing of the paper is concerned and the forward travel of the paper is intermittent.

The present invention aims at correcting these disadvantages. The invention deals with the method of regulating the forward travel of the strip as well as with a device for regulating the forward travel of a strip, as well as with a wrapping machine equipped with such a device.

It is probable that the above-mentioned disadvantages of the prior art are connected with the fact that the detection is employed for acting almost instantaneously upon the forward travel of the paper and correcting it. Hence it is probable that the progress allowed by the present invention is due at least in part to the fact that processing has been introduced between detection and correction; in other words, the detection does not control the correction but the detection is employed for calculating the correction.

Again, certain restrictions concerning the printing of the paper are raised by the fact that the detection is followed by an identification which enables the signal associated with a mark to be distinguished from a signal which is not relevant or from interference. In addition the detection is no longer locked onto one portion of the cycle. This is also allowed by the relative independence introduced between the detection and the correction.

Figure 1:
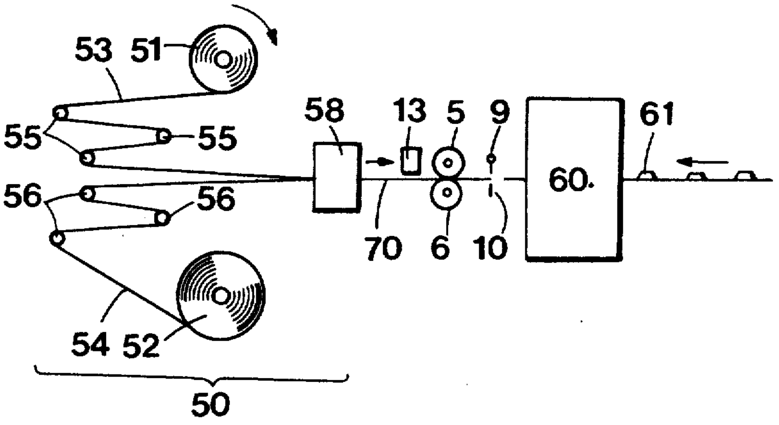
Figure 3:
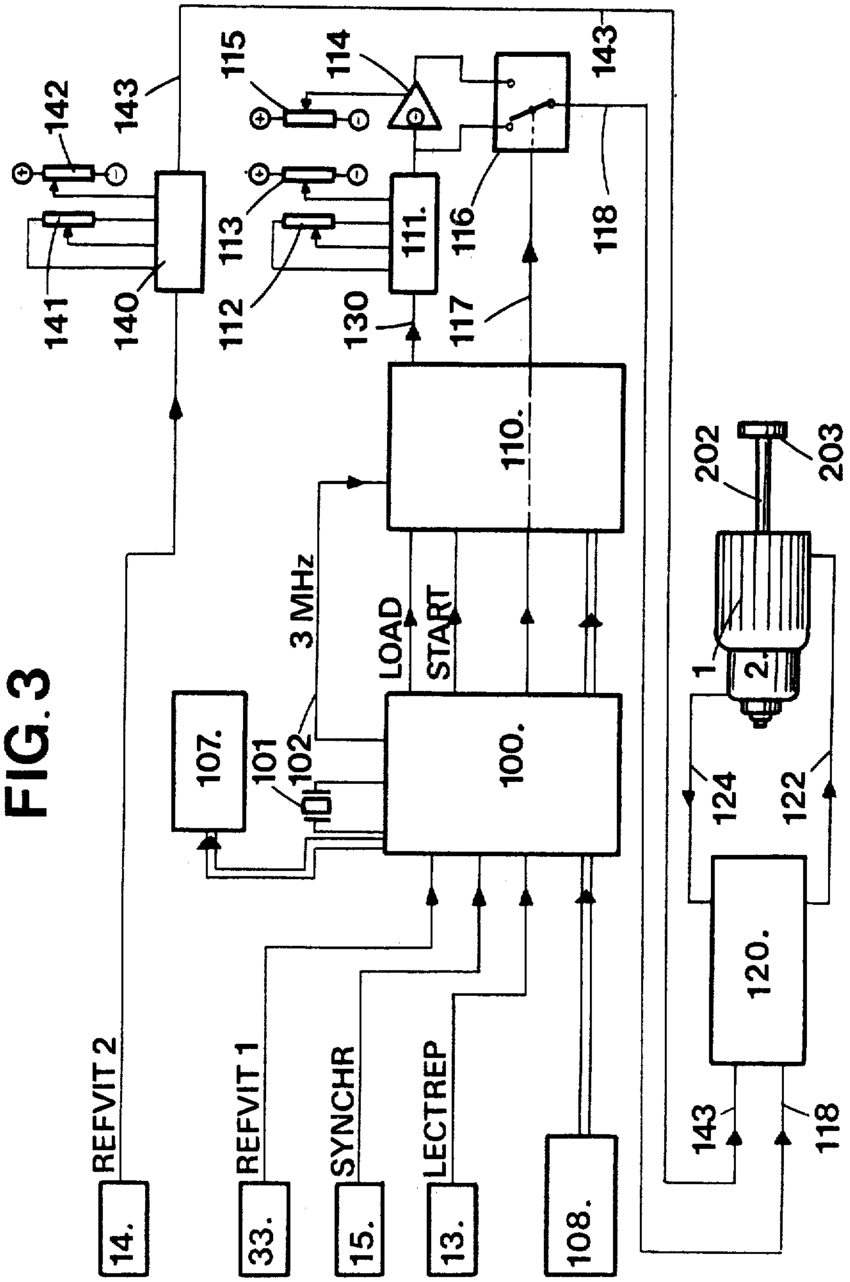
Figure 4:
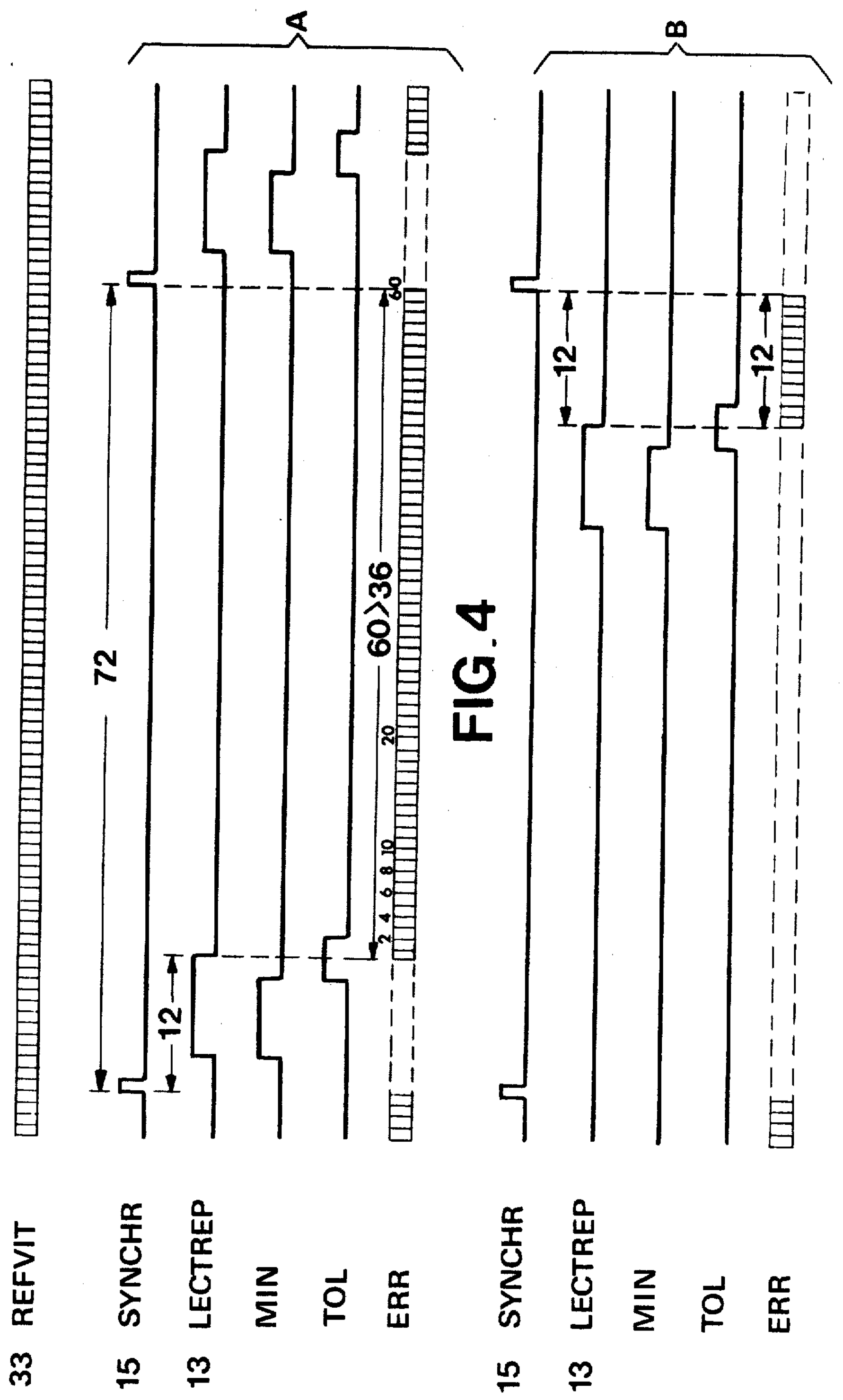
Figure 5:
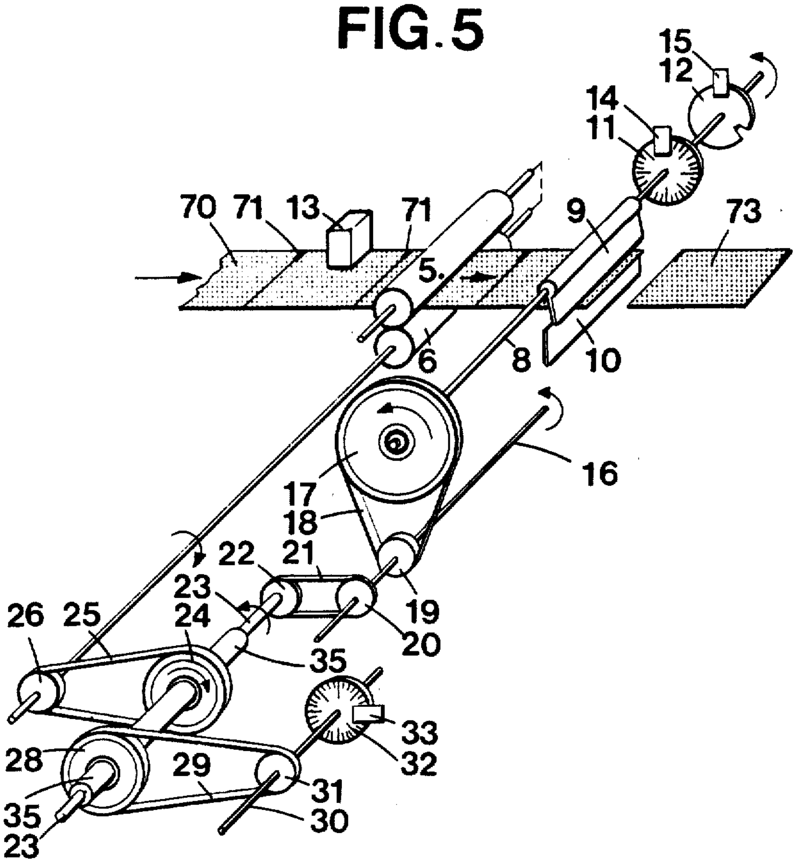
Figure 6:
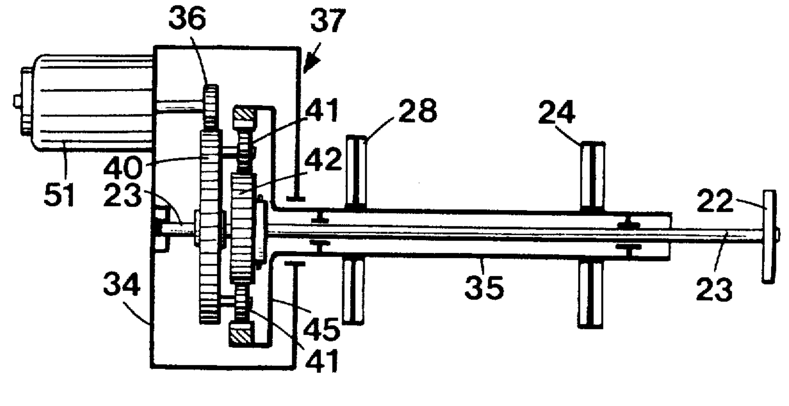
Figure 7:
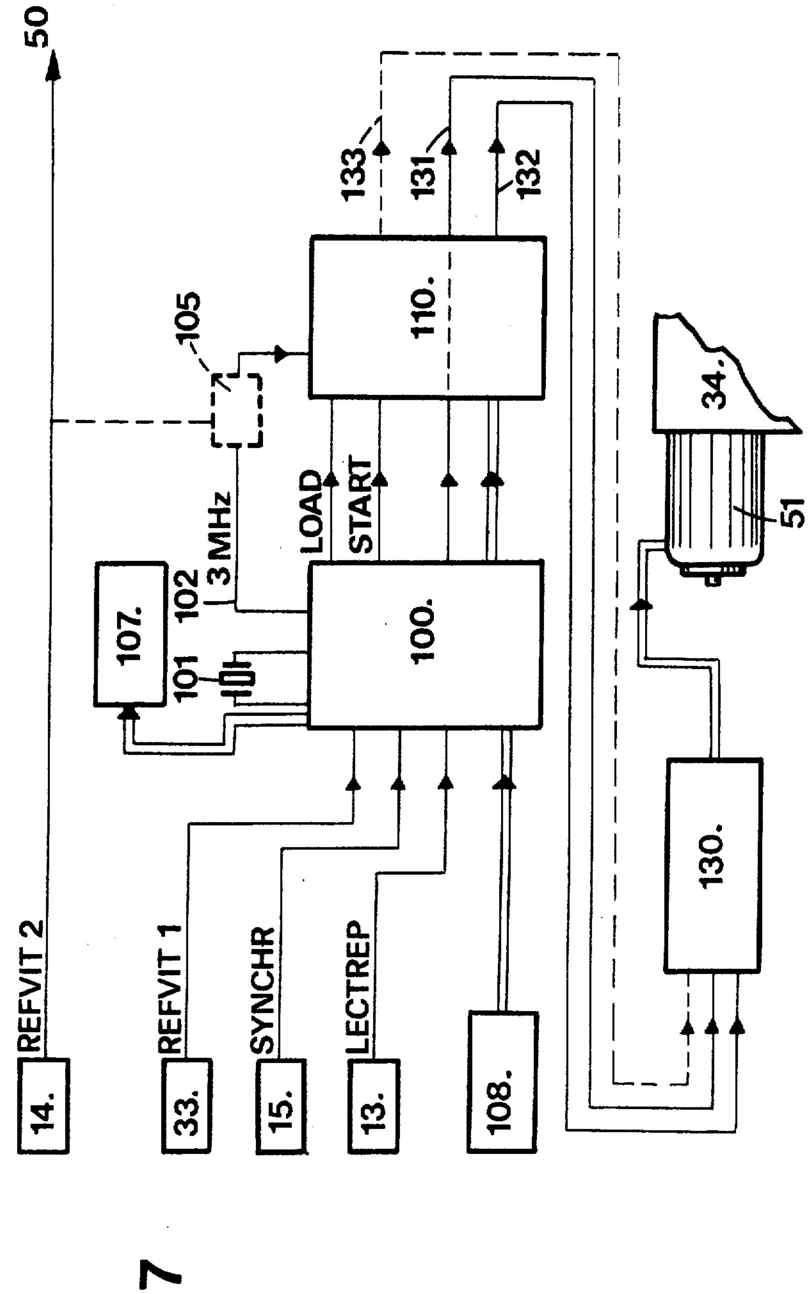

Other special features and advantages of the invention will become better apparent from the reading of the description of some embodiments given below by way of example and by reference to the drawings in which:

FIG. 1 represents diagrammatically various portions of a wrapping machine,

FIG. 2 represents diagrammatically a device for driving the paper and a cutting device, FIG. 3 represents diagrammatically the control circuits of the devices as FIG. 2, FIG. 4 is a time graph illustrating the operation of the circuits as FIG. 3, FIG. 5 represents diagrammatically a device for driving the paper and a cutting device in accordance with another embodiment, FIG. 6 represents a differential with a stepping motor for the devices as FIG. 5, and FIG. 7 represents diagrammatically the control circuits of the devices as FIGS. 5 and 6.

In FIG. 1 there is represented diagrammatically a wrapping machine fed on the one hand with a succession of articles for wrapping 61 and on the other hand with a paper strip 70 supplied continuously by a splicer 50. The splicer comprises one spool in process of unwinding 51 and one spare full spool 52. The strips 53, 54 proceeding from the respective spools pass through a series of rollers 55 and converge on a connection station 58. When the spool in progress 50 is nearly consumed, the connection station connects by gluing the end of the strip 54 to the start of the strip 53 without interruption of the motion. The abrupt starting up of the strip 54 is absorbed by movement of certain of the rollers 56 mounted for this purpose upon hinged arms (not shown). As devices of splicer species are sufficiently well known it has not been represented in detail. The splicer 50 supplies continuously a strip 70 which passes under a detector 13, is driven by the upper feed roller 5 and lower roller 6 and is cut up into sections by a revolving blade 9 cooperating with a fixed blade 10. The cut sections are employed in the machine 60 for the individual wrapping of the articles 61.

In FIG. 2 can be seen the strip 70 including a sequence of sections 72 separated by marks 71. The sections include other signs and marks too, which are not shown. The marks 71 pass below a photoelectrical mark detector 13. The strip is driven by the upper feed roller 5 and lower roller 6, connected mechanically in order to turn in synchronism. The lower roller is driven by a d.c. motor 1 by way of a mechanical transmission device 200 which introduces a certain ratio of reduction between the output shaft of the motor 1 and the shaft of the roller 210. A pulley 203 keyed onto the shaft of the motor 1 is connected by belt to a pulley 204 which is integral in rotation with a pulley 205 which in turn drives by belt a pulley 206 keyed onto the shaft of the lower roller 6.

The motor 1 is associated with a tachometer dynamo 2 employed in a regulating loop for the control of the motor 1. Onto the shaft of the motor 1 there is also keyed a pulse generator formed of a wheel 32 bearing radial marks and an associated photoelectric detector 33.

The strip 70 after having passed between the feed rollers 5, 6 passes between a revolving blade 9 and fixed blade 10 which periodically sever the strip in order to separate the sections. The section which has just been separated 73 is then employed by the machine for wrapping an article.

The revolving blade 9 is driven in rotation by the shaft 8. The shaft 8 is connected to the mechanical members of the wrapping machine, in particular to the members of the wrapping station (not shown). The shaft 8 carries a pulse generator formed of a wheel 11 bearing radial slits and a photoelectric pick-up 12. The same shaft 8 also carries a synchronisation signal generator formed of a wheel 12 bearing a notch and an associated photoelectric pick-up 15.

The function of the circuits in FIG. 3 is the control of the motor 1 which drives the paper feed rolls 5, 6 as a function of various signals. The photoelectric detector 14 produces pulses the frequency of which is proportional to the speed of rotation of the shaft 8 which carries the revolving blade 9 and which is connected kinematically to the main mechanical members of the wrapping machine and in particular to the wrapping station (not shown). Hence the signal produced by this detector 14 forms a speed reference signal REFVIT2 indicating the speed of operation of the sectioning and wrapping stations. This signal terminates at a frequency-voltage conversion circuit 140 which delivers at its output 143 a signal the voltage of which is proportional to the frequency of REFVIT2. The circuit 140 includes scale regulation 141 by rheostat which enables the length of the cut portion to be chosen without correction.

The voltage signal supplied at the output 143 forms a basic speed order for a unit 120 for control of the motor 1 which drives the paper feed rollers 5, 6. Action upon the rheostat 141, all the other parameters being kept constant, will hence have the effect of a modification of the basic speed order and hence a modification of the paper feed speed and consequently a modification of the length of the cut portion. The circuit 140 likewise has an adjustment (offset) rheostat 142.

The control unit 120 is of the "four-quadrant regulator" species and for the control of the motor 1 it employs a regulating loop comprising the tachometer dynamo 2. The control unit 120 admits two input order quantities the first of which has just been seen, which is the basic speed order from the line 143. If the control unit 120 operates on the basis of this signal only one has simply a proportional subordination of the forward travel of the paper to the rhythm of the machine, that is to say, of the shaft 8 connected kinematically to the sectioning and wrapping stations. This is roughly speaking what happens when the paper strip 70 is correctly in phase with respect to the operating cycle of the machine.

The other circuits of FIG. 3 allow the establishment of a correction signal at the time when a phase shift appears in the paper strip 70. The photoelectric detector 33 produces pulses the frequency of which is proportional to the speed of rotation of the motor 1 and it forms a speed reference signal REFVIT1. The photoelectric detector 15 supplies a pulse at each revolution of the revolving blade 9, that is to say, at each cycle of the machine. Hence it gives a phase reference signal SYNCHR of the operation of the sectioning and wrapping stations. The photoelectric detector 13 produces a pulse at the time of passing of a mark 71 on the strip 70.

These signals are supplied to a logical control circuit 100 comprising as its main component a logical processor, for example, a microprocessor "INTEL 8085". This control circuit 100 is endowed with a quartz crystal 101 and can supply a clock signal at 3 MHz over a line 102. The logical control circuit 100 is connected to a digital selector having eight bits 108 forming an input peripheral. This selector is employed for digitally choosing the value of the length of cut section between 0 (zero) and 255 arbitrary units. The control circuit 100 is likewise connected to a display device 107, for example, having light-emitter diodes (LED), which forms an output peripheral for displaying, for example, the correction values.

The logical control circuit 100 pilots a rapid processor 110, for example, a microprocessor CD 1802 D known as a "COSMAC" from the firm R.C.A. The logical control circuit 100 supplies to the rapid microprocessor a quantity which is the value of the correction in 7 bits as well as the direction which necessitates 1 bit; it also supplies LOAD and START pulses and the clock signal. In response to the control signals the rapid processor 110 sends over the line 130 a train of pulses the frequency of which is converted into voltage by the conversion circuit 111. Like the other conversion circuit 140, the circuit 111 includes a scale regulation by rheostat 141 and an adjustment (offset) rheostat 113. The output from the convertor 111 is inverted by the inverter amplifier 114 which likewise has an adjustment (offset) rheostat 115. An electronic switch 116 chooses for the output line 118 either the reversed signal leaving the invertor amplifier 114 or the nonreversed signal leaving the conversion circuit 111 directly. The position of the switch 116 is controlled by the direction bit over the line 117. The voltage supplied over the line 118 forms a correction order signal for the control unit 120.

FIG. 4 illustrates the operation of the circuits of FIG. 3. It shows by a time graph how a signal from the reading of a mark 71 is identified, how a possible phase shift of the paper strip 70 with respect to the operation of the wrapping machine is evaluated; in the case A the strip is showing a lag and in the case B the strip is showing a lead.

The signal REFVIT is a succession of pulses produced by the pulse generator comprising the detector 33 and the wheel 32 keyed onto the shaft 8 of the driving motor 1 of the feed rollers 5, 6. The signal SYNCHR is produced by the detector 15 associated with the notched wheel 12 which gives one pulse at each revolution of the shaft 8, that is to say, at each cycle of the machine. In FIG. 4 it may be observed that one cycle or one period of SYNCHR is equivalent to 72 pulses of REFVIT. In reality one machine cycle is equivalent to a much higher number of pulses, for example, 1000 pulses, but the number of 72 has been chosen for illustrating the example. Similarly the other values are relatively arbitrary and have only an example value.

When a mark 71 passes below the detector 13 the latter produces the signal LECTREP which has the shape of a rectangular pulse of a certain length, for example 9 small periods of the signal REFVIT. In order to identify the signal LECTREP the control circuit 100 creates a pulse MIN commencing with the leading flank of LECTREP; this pulse MIN represents the minimum duration that LECTREP must have in order to be admitted. At the end of MIN the control circuit 100 creates a pulse TOL which represents the interval between the minimum duration and the maximum duration which LECTREP must have in order to be admitted; hence it is the tolerance interval for LECTREP. In the case represented, LECTREP is admitted since its final flank falls in the middle of TOL. In the case of FIG. 4A, MIN lasts 7 small periods, TOL lasts 4 small periods and LECTREP lasts 9 small periods; hence the latter is correct since it is between the minimum of 7 and the maximum which is equal to 7+4=11.

Normally the end of the signal LECTREP should coincide with the pulse SYNCHR. In the case A it may be seen that LECTREP shows a certain lag. For evaluating this lag, in order consequently to establish the correction, the control circuit 100 counts the pulses starting from the end of LECTREP, as illustrated by the signal ERR. This counting comes to an end when the signal SYNCHR appears. In the case of FIG. 4A the totalled number of pulses equals 60. It might be considered that LECTREP is showing a lead of 60 pulses with respect to the next SYNCHR signal. But it is more rational to consider that it shows rather a lag with respect to the preceding SYNCHR signal. The logical choice consists in comparing the error found with half the duration of the cycle of the machine. If the error found is greater than half the duration of the cycle, then the misalignment equals the duration of the cycle less the error and is a lag. This is the case here:

$$60>72/2$$

and the misalignment equals:

$$72-60=12.$$

The direction of the correction is coded by the control circuit 100 into the direction bit and the value of the correction is supplied to the rapid processor in the form of a binary number of 7 bits. The rapid processor employs these data for establishing a train of pulses as a function of suitable programmes which take into account especially the desired speed of the correction, the desired acceleration and deceleration, in short, the "kinematic" of the correction. These pulses are supplied over the line 130 and employed as already described above for controlling the motor 1.

Case B illustrates the reverse case of a lead. As previously the signal LECTREP is admitted and starting from its final flank a count commences as illustrated by the signal ERR, which counts 12 periods up to the next occurrence of the pulse SYNCHR. One has:

$$12<72/2.$$

Hence the error is a lead and its value 12 as given is taken directly for the correction.

A misalignment signifies that the marks and the texts on the cut section are offset and that the section is not being cut at a good place. The section is then employed all the same in the wrapping station but the corresponding article is eliminated because its appearance is unacceptable. The control circuit which has detected the misalignment sends to the wrapping station a signal for the automatic elimination of the article.

The admissable correction for the forward travel of the paper shows a maximum. In fact the correction of a misalignment signifies that the next section is going to be cut shorter (or longer). It is however necessary that the length of the section remain acceptable for the wrapping station because an interruption must absolutely be avoided. One will adopt, for example, as the maximum value of the correction ±15 mm. If a misalignment is produced greater than these 15 mm, for example, a misalignment of 75 mm, that will simply have the effect that the misalignment will be overtaken in a number of cycles, here in five cycles, with the elimination of five articles. The elimination of several articles is obviously preferably to a stoppage of the machine.

The value ±15 mm for the maximum value of the correction is taken here as an example. This value is imposed by the wrapping station and might be changed. If the wrapping station can adapt itself to cut sections exhibiting a greater difference, for example, of ±50 mm and continue to operate without choking or any hitch (leaving the unacceptable articles to be eliminated afterwards), this latter value of ±50 mm may then be taken as the maximum value of correction.

In the case of change of the format of the cut section, when one is preparing to wrap a new series of articles, the new length of the section must be transferred to the selector 108.

On the other hand the distance between detector 13 and blades 5, 6 has been assumed equal to a multiple of the said length. If the latter changes it is advisable to shift the detector 16 which may be mounted on a rail. But as an alternative one may shift angularly the notched wheel 12 which serves to create the signal SYNCHR. A developped solution consists in leaving unchanged the detector 13 and the notched wheel and in acting only upon the level of the logical elements (soft) of the processor of the logical control. That is, all of the information necessary is supplied by the selector 108 and it is easy for one skilled in the art, taking as a basis the present description, to program the processor accordingly.

The changing of format likewise implies a modification of the driving speed of the paper. If the cut sections are, for example, longer this speed will have to be greater for a given rhythm of the machine. Hence the speed of the rollers must be regulated by regulating the rheostat 141 accordingly. As indicated above this rheostat enables the length of cut section to be chosen without correction. This latter regulation is not critical. A residual error, for example, of ±5 mm, is not very troublesome in the case envisaged where the maximum correction equals ±15 mm; the error is automatically compensated.

FIGS. 5 to 7 illustrate an embodiment in which the forward travel of the paper is coupled mechanically to the remainder of the wrapping machine, in particular to the sectioning and wrapping stations, by way of a differential which enables the suitable corrections to be introduced under the control of electronic circuits.

The shaft 16 is connected kinematically to various mechanical members of the wrapping machine, in particular to the members of the wrapping station (not shown). The shaft 16 may be the main driving shaft of the machine. This shaft 16 drives the shaft 8 of the revolving blade by way of the pulley 19, the belt 18 and the pulley 17 keyed onto the shaft 8. The shaft 16 likewise drives a shaft 23 by way of a pulley 20, a belt 21 and a pulley 22 keyed onto the said shaft 23. This shaft 23 turns inside a hollow shaft 35.

The shaft 23 and the hollow shaft 25 are connected by a differential 37. In the casing 34 of the differential the hollow shaft drives an outer crown 45 and the shaft 23 drives an internal planet gear 42. Between the outer crown 45 and the internal planet gear 42 are engaged the satellite pinions of a satellite-carrier crown 40. The satellite-carrier crown 40 meshes with a pinion 36 keyed onto the shaft of a stepping motor 51.

The hollow shaft 35 drives a shaft 30 by way of a pulley 28, a belt 29 and a pulley 31 keyed to the shaft 30. The shaft 30 drives a pulse generator comprising a wheel 32 bearing radial marks and a photoelectric detector 33. The hollow shaft 35 likewise drives the lower feed roller 6 by way of a pulley 24, a belt 25 and a pulley 26 keyed to the shaft of the lower roller 6. The wheel 32 of the pulse generator and the paper feed rollers 5 and 6 are connected kinematically.

If the motor 51 is at standstill and consequently the satellite-carrier crown 40 is immovible, the differential behaves as a gear introducing a certain ratio of reduction between the shaft 23, considered as the driving shaft, and the hollow shaft 35 which is the driven shaft. As the hollow shaft finally drives the rollers 5 and 6 and as the shaft 23 in turn is connected mechanically to the shaft 16 of the machine one would then have a mechanical transmission with a given ratio of reduction between the shaft 16 of the machine and the paper feed rollers 5, 6. This is roughly what happens when the paper strip 70 is correctly in phase with respect to the operational cycle of the machine.

The motor 51 and the circuits of FIG. 7 come into play when there appears a phase shift in the paper strip 70.

The function of the circuits of FIG. 7 is the control of the stepping motor 51 which introduces through the differential 37 a correction in the driving of the paper feed rollers 5, 6 as a function of various signals.

The photoelectric detector 14 produces pulses the frequency of which is proportional to the speed of rotation of the shaft 8. This signal does not as a rule play an essential part in this embodiment. It possibly enables piloting of the splicer 50. It may also be employed for modifying the clock signal received by the rapid processor 110 by way of a circuit 105. This enables, for example, tests to be carried out at low speed. The rapid processor may be the CD 1802 D known as a "COSMAC" from the firm R.C.A.; such a processor can operate at a very low rhythm and even step by step, with a clock signal which may have an arbitrarily low frequency and in the limit none. The acceleration and the deceleration provided by a program for a given "kinematic" will then be proportionally reduced in the simplest manner, which makes easy certain tests.

The detectors 33, 15 and 13 and their signals have already been described above in connection with the previous embodiment. Similarly, the control circuit 100 and the rapid processor 110 are similar to those described above. The signals produced by the rapid processor 110 comprise as previously a sign bit supplied over the line 132 and a train of pulses over the line 132. The latter are not, however, converted into a voltage as previously, but employed in a control unit 130 controlling the stepping motor 51. The processor 110 includes optionally a special output 133 for a signal indicating whether the motor 51 should operate or not. If the motor 51 should not be turning it is preferable to reduce its rest current in order to avoid excessive consumpiton and undesirable heating. Hence the control unit 130 is preferably arranged in order to reduce the rest current as a function of the signal from the line 133.

In the case of changing the format of the cut section the new length must be transferred to the selector 108 in a similar way to that provided for the machine as FIGS. 2 and 3.

Similarly it is desirable either to shift the detector 13 or to offset angularly the notched wheel 12, or else to act upon the level of the logical element (soft) solely, which obtains the necessary information through the selector 108.

In addition the driving speed of the paper must again be modified. As the motor 51 serves only to introduce corrections, the mechanical ratio must be changed, which exists between the shaft 8 and the rollers 5, 6 when the motor 51 is stationary. This ratio may be changed by, for example, replacing the wheel 26 and its belt 25. In a variant upon the machine one might install a mechanical variator in place of the belt transmission 24, 25, 26 and one would regulate this variator.

The latter regulation is not critical. A residual error may be left, for example, of ±5 mm, in the case envisaged where the maximum correction equals ±15 mm; this error is automatically compensated.

I claim:

1. A method for regulating the forward travel of a strip (70) which at regular intervals bears section marks (71) and which is cut into sections (73) and used to individually wrap a succession of articles (61) comprising the steps of:

cyclically cutting said strip (70) into sections and using a cut section (73) to wrap one of said succession of articles (61);

detecting the passing of each mark (71) of said strip and providing a signal (LECTREP) indicating said detection;

generating from each cutting and wrapping cycle a phase reference signal (SYNCHR) indicating at what time said mark (71) should be detected;

measuring the phase error between the signal indicating detected passing of the mark (LECTREP) and the phase reference signal (SYNCHR);

temporarily modifying the driving speed of the strip (70) so that it adopts either a lead or lag correction for compensating the measured phase error; and, limiting the lead or lag correction to a maximum amplitude of correction such that a cut-off section (73) has a length sufficient to wrap an article.

2. A method as in claim 1, characterized in that when a phase error greater than a given tolerance is detected a signal is produced which is used to eliminate an article wrapped in a cut-off section.

3. A method as in claim 1 or 2, characterized in that the strip is driven in a manner kinematically independent of the cutting and wrapping operations.

4. A method as in claim 1 or 2, characterized in that the driving of the strip (70) is connected mechanically to the cutting and wrapping operations by way of a differential (37) and in that the lead or lag correction of the driving of the strip with respect to the cutting and wrapping operations is introduced by means of the differential (37).

5. A device for regulation of the forward travel of a strip (70) which at regular intervals bears section marks (71) and is cut off at a sectioning station (9, 10) into sections (73) employed at a wrapping station (60) for individual wrapping of a succession of articles (61), comprising means (5, 6) for driving the strip (70), which are actuated by a motor (1) in a manner kinematically independent of the sectioning (9, 10) and wrapping (60) stations, a mark detector (13), a phase reference detector (15, 12) actuated by one of the two stations for sectioning (9, 10) and wrapping (60) respectively, and supplying a signal (SYNCHR) intended to coincide with a valid signal (LECTREP) from the mark detector (13) when the mark (71) is presented correctly, and control means (100-120) for validating the signal (LECTREP) from the mark detector by eliminating interference and signals not corresponding with a mark and for evaluating the error between the two signals (SYNCHR, LECTREP) and consequently imposing upon the driving motor (1) a temporary modification of its speed, intended to correct the movement of said strip to compensate the said error, the correction being, however, limited to a maximum value of correction such that the resultant section (73) has a length acceptable for the operation of the wrapping station (60).

6. A device as in claim 5, characterized in that the control means (100–120, FIG. 3) comprise processing means (100, 110) and a control unit (120) and in that the processing means include a calculating circuit (100) for evaluating the amplitude of the correction and a processor (110) for establishing the order for the correction as a function of the calculated amplitude and under the control of the calculating circuit (100), the order being supplied to the control unit (120) which actuates the motor (1).

7. A device as in claim 5, characterized in that the control means (100–120, FIG. 3) comprise processing means (100, 110) and a unit (120) for control of the motor (1), in that the control unit (120) comprises a first input (143) for a basic speed order and a second input (118) for a correction order, in that it comprises a speed reference detector (11, 14) actuated by one of the stations for sectioning (9, 10) and wrapping (60) respectively, in that a signal (REFVIT 2) from this speed reference detector (11, 14) controls the first input (143) and that the second input (118) is controlled by the said processing means (100, 110).

8. A device as in claim 7, characterized in that the speed reference signal (REFVIT 2) produced by the speed reference detector (11, 14) consists of a succession of pulses, in that the processing means (100, 110) supply for the correction a signal consisting likewise of a succession of pulses, in that the inputs (143, 118) to the control unit are inputs for analogue signals, and in that each of the inputs is preceded by a converter (111, 116) for converting the said successions of pulses into respective analogue signals of amplitude proportional to the frequency of the pulses.

9. A device as in claim 8, characterized in that the processing means (100, 110) comprise a calculating circuit (100) for calculating the amplitude of the correction and a processor (100) for establishing under the control of the logical calculating circuits (100) and as a function of the amplitude of the correction, the said correction order having the form of a succession of pulses.

10. A device for regulation of the forward travel of a strip (70) which at regular intervals bears section marks (71) and is cut off at a sectioning station (9, 10) into sections (73) employed at a wrapping station (60) for individual wrapping of a succession of articles (61), characterized in that it comprises means (5, 6) for driving the strip (70), a differential (37) which mechanically couples the driving means (5, 6) to the sectioning (9, 10) and wrapping (60) stations, a motor (51) coupled to the differential for introducing a difference in speed between the driving means (5, 6) and the sectioning (9, 10) and wrapping (60) stations, a mark detector (13), a phase reference detector (15, 12) actuated by one of the two stations for sectioning (9, 10) and wrapping (60) respectively, and supplying a signal (SYNCHR) intended to coincide with a valid signal (LECTREP) from the mark detector (13) when the mark (71) is presented correctly, and processing means (100–120) for validating the signal (LECTREP) from the mark detector by eliminating interference and signals not corresponding with a mark and for evaluating the error between the two signals (SYNCHR, LECTREP) and consequently imposing upon the motor (51) a temporary motion producing a temporary difference in speed between the driving means (5, 6) and the sectioning (9, 10) and wrapping (60) stations, intended to correct the movement of said strip and compensate the said error, the correction being, however, limited to a maximum value of correction such that the resultant section (73) has a length acceptable for the operation of the wrapping station (60).

11. A device as in claim 10, characterized in that the control means (100–130, FIG. 7) comprise processing means (100, 110) and a control unit (130) and in that the processing means include a calculating circuit (100) for evaluating the amplitude of the correction and a processor (110) for establishing the order for the correction as a function of the calculated amplitude and under the control of the calculating circuit (100), the order being supplied to the control unit (120) which actuates the motor (51).

12. A device as in claim 10, characterized in that the motor (51) is a stepping motor.

13. A device as in one of the claims 5 to 12 which is employed in an article wrapping machine.

14. A device as in claim 11, characterized in that the motor (51) is a stepping motor.

* * * * *